United States Patent [19]

Shigeyama et al.

[11] 3,784,749

[45] Jan. 8, 1974

[54] NOISE ELIMINATING DEVICE

[75] Inventors: Shogo Shigeyama, Kawasaki; Yoichiro Yamada, Yokohama; Kunihiro Kondo, Urawa, all of Japan

[73] Assignee: Trio Kabushiki Kaisha, Tokyo-To, Japan

[22] Filed: Feb. 9, 1972

[21] Appl. No.: 224,790

[30] Foreign Application Priority Data

Feb. 10, 1971 Japan .................................. 46/5361

[52] U.S. Cl. .................................................. 179/1 P
[51] Int. Cl. .................................................. H04b 15/00
[58] Field of Search .................. 179/1 P, 1 D, 1 UL, 179/1 G; 333/28 T

[56] References Cited

UNITED STATES PATENTS

| | | | |
|---|---|---|---|
| 3,394,226 | 7/1968 | Andrews | 179/1 D |
| 2,171,671 | 9/1939 | Percival | 179/1 D |
| 3,388,217 | 6/1968 | Aiken | 179/1 G |
| 2,606,972 | 8/1952 | Scott | 179/1 P |
| 3,678,416 | 7/1972 | Burwen | 179/1 P |

*Primary Examiner*—Kathleen H. Claffy
*Assistant Examiner*—Jon Bradford Leaheey
*Attorney*—Holman & Stern

[57] ABSTRACT

In a noise reducing device for reducing noises contained in audio signals, a frequency band wherein noises contained in audio signals are highly sensible to an auditor, but the frequency of appearance therein of the audio signals is substantially low is blocked by a required number of band-elimination filters provided in series in a transmission line for transmitting the audio signals, each of the band-elimination filters being bypassed by a corresponding variable impedance circuit, while the same frequency band is passed through a corresponding number of band-pass filters, the outputs of said band-pass filters being supplied respectively to corresponding control signal producing circuits to produce control signals, whereby said variable impedance circuits bypassing the band-elimination filters are controlled respectively by said control signals, and the band-elimination filters are thereby brought into a state effectively blocking the frequency band when the input audio signal level in said frequency band is lower than a predetermined value and vice versa.

8 Claims, 21 Drawing Figures

FULL LINE INDICATES A CASE WHEREIN THE FREQUENCY OF SOUND B IS 800HZ AND DOTTED LINE INDICATES A CASE WHEREIN THE FREQUENCY OF B SOUND IS 2.4KHZ

SOUND B IS NOISES IN A NOISE BAND OF FROM 530 TO 1600HZ

NOISE ELIMINATING DEVICE

BACKGROUND OF THE INVENTION

This invention relates to noise eliminating devices, and more particularly to a type thereof wherein noises occurring in recording magnetic tapes or discs or in the reproducing devices thereof are eliminated psycho-acoustically in the course of the reproduction thereof.

When music or the like once recorded is produced through a tape-reproducing device, if the intensity of the musical sound is lowered to pianissimo, noises such as tape-hiss or the like are made audible, whereby the auditory sensation for the music is greatly impaired.

Heretofore, various methods for reducing noises introduced in various audio-systems have been proposed. One of such methods employing filters, such as high-pass filters or low-pass filters, is widely used because of its low cost. However, this method has a drawback in that the provision of the filters in itself affects the frequency characteristic of the output sound, and hence deteriorates the tone-quality of the output sound.

Another method which has also been utilized widely in the recording and reproducing audio programs is characterized in that the response of a device at a frequency range is emphasized at the time of recording, and the response at the same high frequency range is deemphasized at the time of playback.

Still another conventional method utilizes a depression and expansion circuit for adjusting the sound level in such a manner that the S/N ratio in the output sound is thereby improved. This method is found to have a problem in its cost, and simultaneously it is accompanied by a difficulty in its interchangeability because the recording device and the reproducing device should have compatible characteristics, and sounds recorded by any other device of different characteristic cannot be reproduced correctly.

SUMMARY OF THE INVENTION

Therefore, a primary object of the present invention is to provide a novel device for reducing noises contained in audio signals, wherein all of the above mentioned drawbacks of the conventional method and the devices practicing the methods can be substantially eliminated.

Another object of the invention is to provide a novel device for reducing noises contained in audio signals wherein the annoying effect of the noises can be eliminated in a psycho-acoustic manner.

Still another object of the invention is to provide a novel device for reducing noises contained in audio signals, wherein a frequency band in which the noises are highly sensible to auditors, but audio programs do not frequently appear therein is selected, and a filter circuit is operated only when an input level of audio signals within the aforementioned frequency band is lower than a predetermined value.

A further object of the present invention is to provide a novel device for reducing noises contained in audio signals wherein the above described filter circuit is further made inoperative when the input level of the audio signal, within the above described frequency band, is higher than the predetermined value, so that noises can be masked by the audio signals at a considerably high level.

The above stated and other objects of the present invention can be achieved by a novel device for reducing noises contained in audio signals, which comprises a transmission line to pass the audio signals, a band-elimination filter provided in the line to block a frequency band wherein noises contained in the audio signal are highly sensible to an auditor, a variable impedance circuit connected in parallel with the band-elimination filter, a band-pass filter to pass a part of signals branched off said line and falling within the above mentioned frequency band, and a circuit for producing a signal to control the variable impedance circuit out of the output signal from the band-pass filter.

The nature, principle, and utility of the present invention will be more clearly understood from the following detailed description of the invention when read in connection with the accompanying drawings, wherein like parts are designated by like reference numerals and characters.

DETAILED DESCRIPTION

As conducive to a full understanding of the present invention, several features of noises will first be described with respect to the case of magnetic sound recording and reproduction.

Generally speaking, noises encountered when a magnetic tape or disc is used to record and reproduce sound can be separated into two parts, namely, a part referred to as background noises, and another referred to as modulation noises. The background noises always appear in the reproduced sound irrespective of the existence or nonexistence of the recorded signal, and this kind of noise is created because of the ununiformity and insufficient erasure of the magnetic tape or undesirable magnetization of the magnetic head. This kind of noise is distributed throughout the entire frequency range of the audio output, and, in the medium and high-frequency portions of this frequency range, the background noises appear in the form of "hiss."

On the other hand, the modulation noises appear in the audio output in a state of superposition thereon only when the reproduced signal exists in the output, and this type of noise is caused by dropping-out or unsatisfactory contact of the magnetic head on the magnetic tape.

Figure 1:
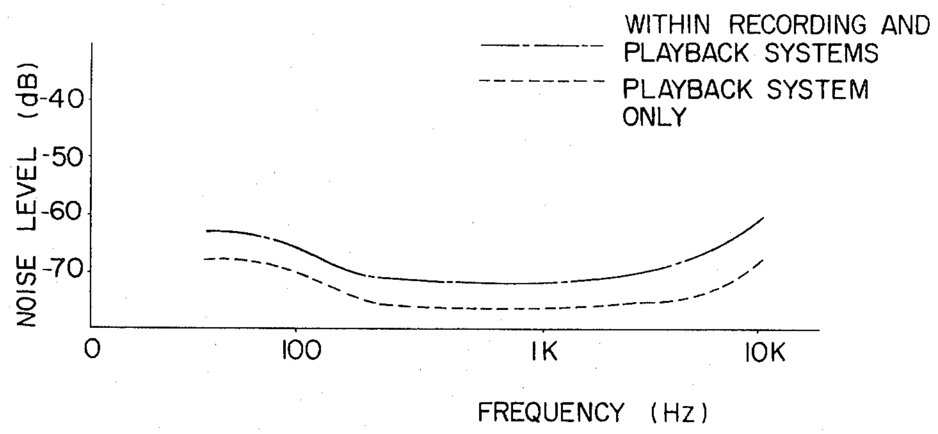
FIGS. 1 through 5 are graphical representations to be referred to in an explanation of the principle of the present invention.

The waveforms of these noises are basically of random nature and depend much on the quality of the magnetic tape. The distribution characteristics of noises caused in the course of recording and reproduction are indicated in FIG. 1. It will be apparent from these characteristics that noises caused in the recording and reproduction are distributed substantially over the entire frequency range of the audio output, and that the noises are maintained at considerably high levels particularly in the range of from 3 to 15 KHz.

Figure 2:
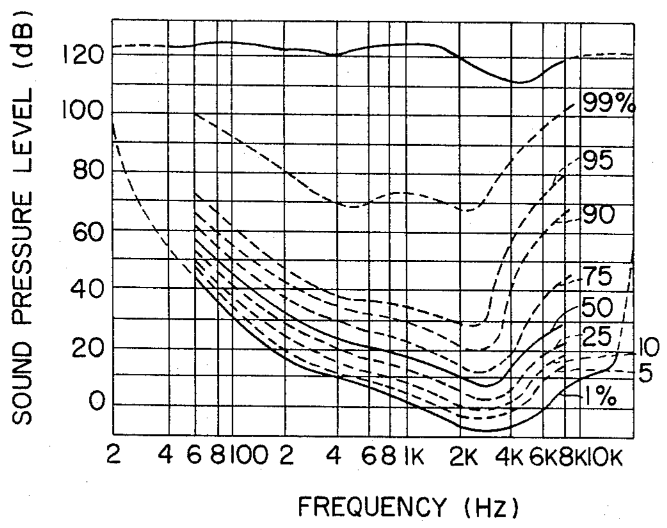

In order to determine the frequency band in which the noises are most discordant or disagreeable to an auditor, the noise distribution characteristics shown in FIG. 1 was received in consideration of the Fretcher-Manson curves shown in FIG. 2, whereupon it was found that the noises in a frequency range of from 2.5 to 15 KHz were most disagreeable.

Figure 3:
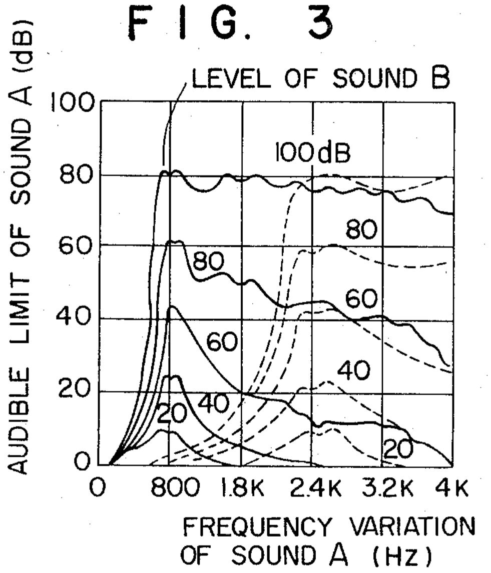
Figure 4:
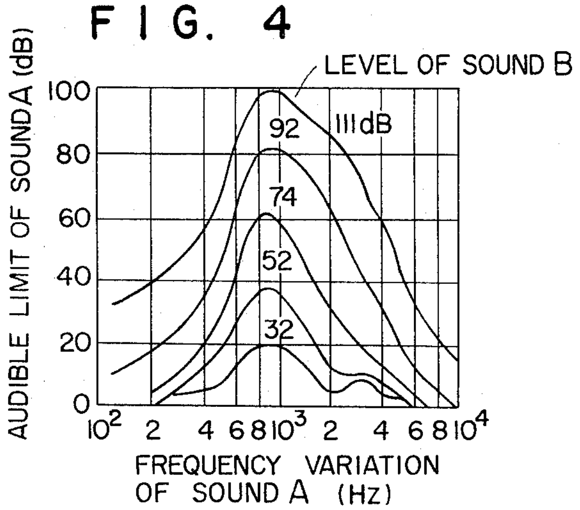

Furthermore, it has been widely known from the psycho-acoustic viewpoint that a masking effect has the effect of reducing noises. FIG. 3 illustrates an example of this effect wherein A and B are both pure sounds. In this example, the intensity and frequency of the sound B are kept constant, while the frequency of the sound A is varied, and the minimum audible intensities of sound A at various frequencies are plotted against the frequency variation. In FIG. 4, there is indicated another example wherein the sound B is a band of noises.

From the test results shown in FIGS. 3 and 4, the following facts are made apparent.

1. In general, the nearer the frequencies of the two sounds are to each other, the easier it is for one of the sounds to be masked by the other.
2. Although a sound of a lower frequency can mask another sound of a higher frequency, it is difficult for the latter to mask the former sound of a lower frequency.
3. In the case where one sound is a band noise of a continuous spectrum such as white noise, and the other sound is a pure sound, it is found that only the noise components falling within a certain frequency range centering around the frequency of the pure sound are related to the masking of the pure sound.

Figure 5:
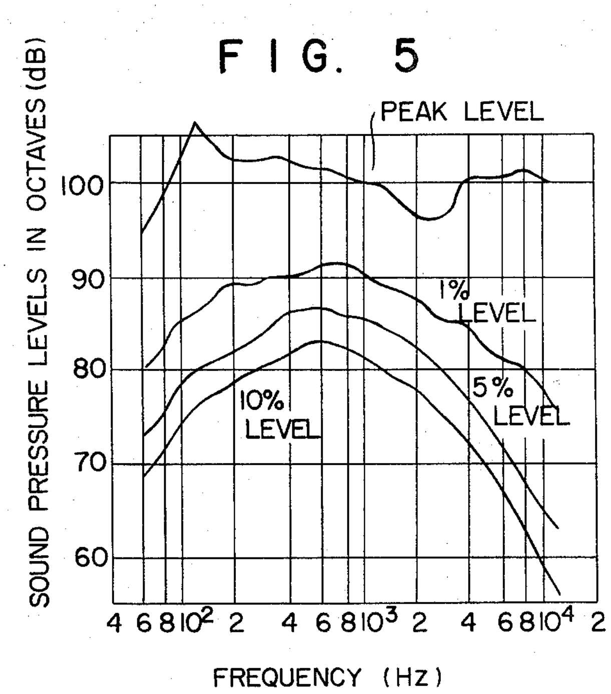

Additionally, the frequency distribution of various sound-pressure levels in various audio devices will next be considered. It is apparent that there are various elements, such as music and voice in the audio sources. Therefore, an orchestra which contains a wide variety of frequencies and sound-pressure levels has been selected as an example of such a sound source, and the distributions of the peak level, one percent time (36 seconds) level, 5 percent time (3 minutes) level, and 10 percent time (6 minutes) level were measured. The results obtained from these measurements are indicated in FIG. 5.

From these test results, it is apparent that while not much deviation appears in the distribution of the peak level throughout the range, considerable deviations are observed in the distributions of the percent-time levels at the low and high frequency portions of the frequency range. Thus, the probability of the noises being masked by audio signals in the low and high frequency portions of the range is very low because such portions of the frequency range contains a rather reduced amount of audio signals. Particularly in the middle and high frequency portions of the frequency range, there is much possibility of the noises which have been masked by a higher level of the audio signals being made audible at the time the sound level of the audio signals is reduced, whereby unpleasant sound is heard by the auditor.

Figure 6:
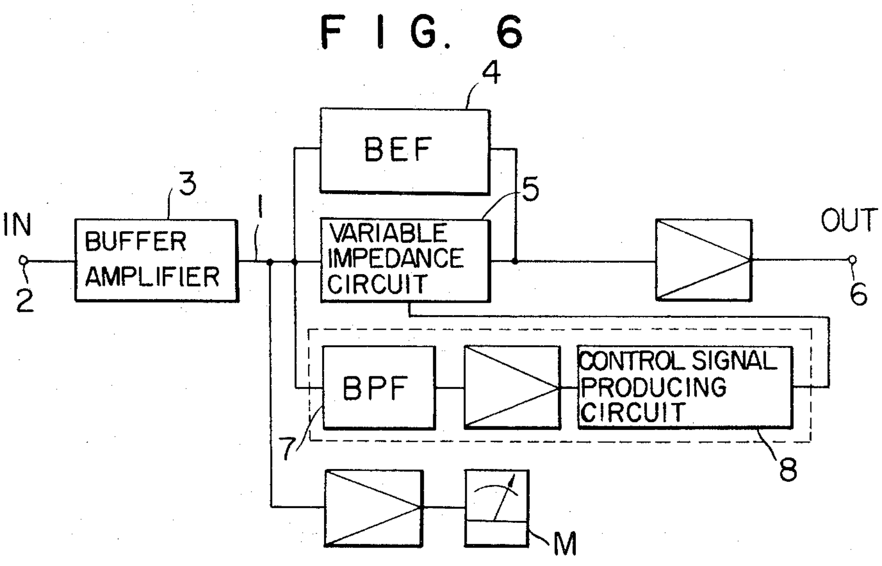
FIG. 6 is a block diagram showing a device according to the present invention which eliminates noises contained in audio signals.

Referring now to FIG. 6, there is indicated a noise reducing device according to the present invention in the form of a block diagram. In the noise reducing device, an audio signal is applied to an input terminal 2 of a transmission line 1 for audio signals. A buffer amplifier 3 provided on the input side of the transmission line 1 is connected in series, at the output side thereof, to a band elimination filter 4 of an extremely low impedance, so that the impedance matching between the buffer amplifier 3 and the band elimination filter 4 must be suitably considered. The band elimination filter 4 is provided in the line to block a frequency band wherein noises included in the audio signal are highly sensible and hence annoying disagreeable to the auditor, but the instances of appearance of the audio signals therein are comparatively few.

A variable impedance circuit 5 connected in parallel with the band elimination filter 4 is composed of variable impedance elements such as diodes made of CdS and conducts the audio signals, inclusive of those in the frequency band wherein noises contained in the audio signal are highly sensible, but the instances of appearance therein of the audio signals are comparatively few, to the output terminal 6 of the transmission track 1 depending on the impedance variation of these elements.

A band-pass filter 7 receives a part of output signals from the buffer amplifier 3 and passes the frequency band which is blocked in the band-elimination filter 4, that is, the frequency band wherein noises contained in the audio signal is highly sensible, but the instances of appearance of the audio signals therein are comparatively few, to a control signal producing circuit 8. This control signal producing circuit 8 rectifies the output signal from the bandpass filter 7 and produces a control signal for biasing the variable impedance circuit 5. An indicator circuit M is provided at the output side of the buffer amplifier 3 and indicates the input level of the audio signals introduced into the noise eliminating circuit.

Figure 7:
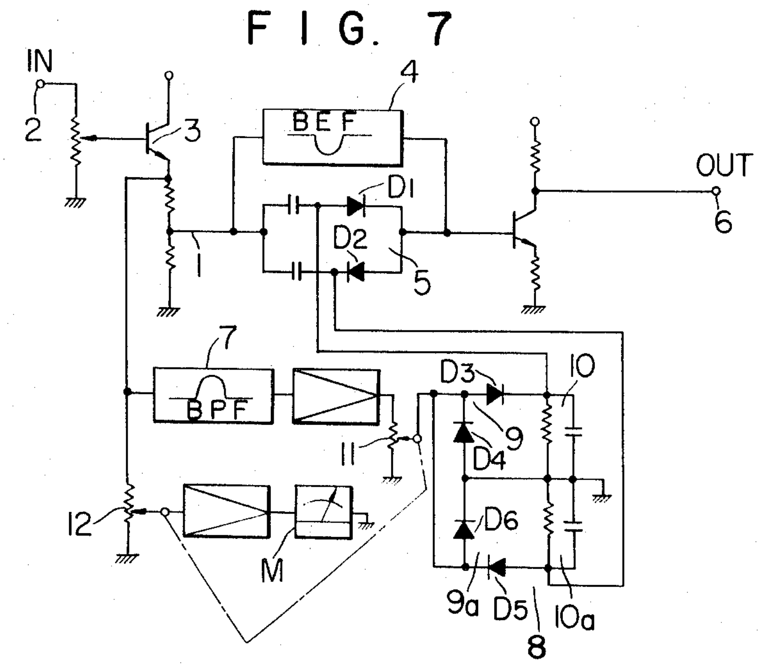
FIG. 7 is a circuit diagram of a device for eliminating noises which constitutes a first embodiment of the present invention.
Figure 8A:
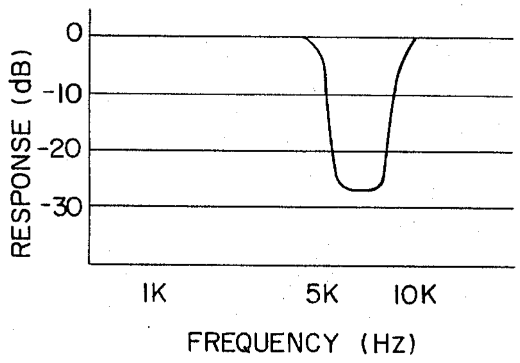
FIGS. 8(A) and 8(B) show a characteristic curve and an example of a band elimination filter employed in the device according to the present invention.
Figure 8B:
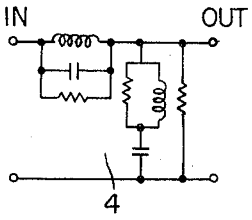

FIG. 7 indicates a specific example of circuitry constituting a first embodiment of the present invention, in which an emitter follower circuit is employed to provide impedance matching between the buffer amplifier 3 and the band-elimination filter 4. The band-elimination filter 4 is composed of a reverse connection of constant K-type filter elements, as shown in FIG. 8(B), to provide a characteristic satisfactory for this particular application. That is, the frequency band wherein noises contained in audio signals are highly sensible but the instances of appearance of the audio signals therein are comparatively few, is thereby blocked effectively.

Figure 10A:
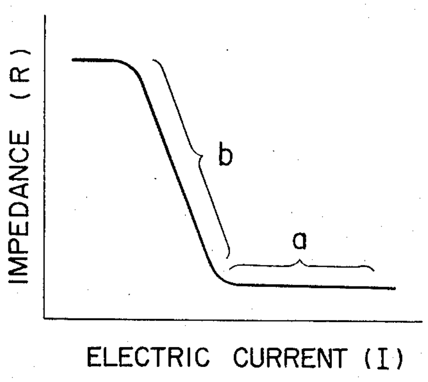
FIGS. 10(A) and 10(B) show a characteristic curve and an example of a variable impedance circuit employed in the device according to the present invention.
Figure 10B:
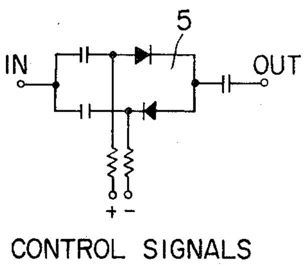
Figure 12:
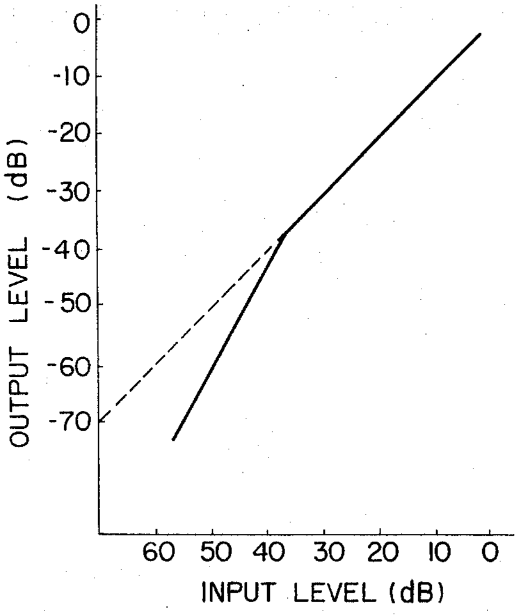
FIG. 12 is a graph showing an emphasizing characteristic of a variable impedance circuit.

The variable impedance circuit 5 has an organization as shown in FIG. 10(B) employing diodes $D_1$ and $D_2$, and the impedance of the circuit 5 is varied as indicated in FIG. 10(A), whereby expansion and compression characteristics as shown in FIG. 12 are obtained. Furthermore, since a secondary distortion tends to be caused because of the employment of the diodes $D_1$ and $D_2$, the two diodes are connected in a balanced manner as shown in FIG. 10(B) for cancelling out the secondary distortion.

Figure 9A:
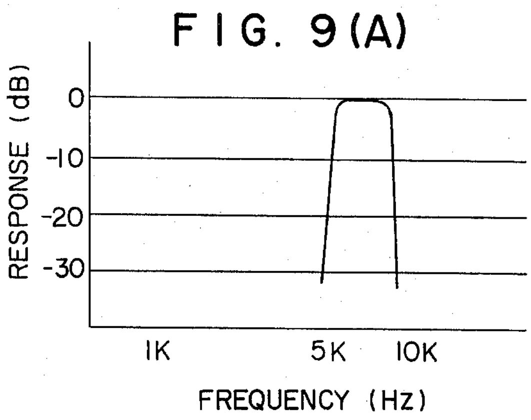
FIGS. 9(A) and 9(B) show a characteristic curve and an example of a band-pass filter employed in the device according to this invention.
Figure 9B:
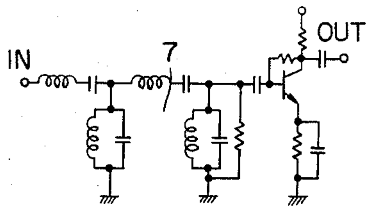

A band-pass filter 7 composed as shown in FIG. 9(B) is provided to produce control signals for the variable impedance circuit 5. A portion of the output signals from the buffer amplifier 3 is branched off from the output side thereof and supplied to the input of the band-pass filter 7, so that only a frequency band equivalent to the frequency band blocked by the band-elimination filter 4, that is, the frequency band wherein noises contained in audio signals are highly sensible but the instances of appearance of audio signals therein are comparatively few, is passed through the band-pass filter 7. Since a sharply attenuating characteristic is required for the band-pass filter 7, two stages of ordinary band-pass filter units have been employed in series.

The control signal producing circuit 8 comprises two rectifying circuits 9, 9*a*, two time constant circuits 10, 10*a*, and a circuitry to apply the output signals of the two time constant circuits to the diodes $D_1$ and $D_2$ of the variable impedance circuit 5 for biasing the two diodes. The two rectifying circuits 9 and 9*a* include diodes $D_3$, $D_4$, and $D_5$, $D_6$, respectively, and produce positively and negatively directed d.c. signals out of the output from the band-pass filter 7. The two time constant circuits 10 and 10*a* are provided for rendering a time constant of at most 10 ms to the impedance variation of the circuit 5 when the rectified d.c. biasing signals are applied to the diodes $D_1$ and $D_2$ of the variable impedance circuit 5 so that the impedance variation of the circuit 5 is not conspicuous to the auditor.

A variable resistor 11 is used for setting a cutoff level of noises. Another variable resistor 12 is provided for varying the audio signal level introduced into the indicating circuit M, and with the variable resistor 12 interlinked with the variable resistor 11, the cutoff point of the noises can also be determined through the reading of the indicating circuit M.

In the operation of the example circuit shown in FIG. 7, if it is assumed that the input signal level at the output side of the buffer amplifier 3 is, for instance, −20 dB, the band-pass filter 7 passes the frequency band as shown in FIG. 9(A) to the subsequent control signal producing circuit 8. Thus, the audio signals in the frequency band are rectified by the rectifying circuits 9, 9*a* including the diodes $D_3$, $D_4$ and $D_5$, $D_6$, respectively, and positively and negatively directing biasing signals are applied to the diodes $D_1$ and $D_2$ in the variable impedance circuit 5 through the time constant circuits 10 and 10*a*.

Figure 11:
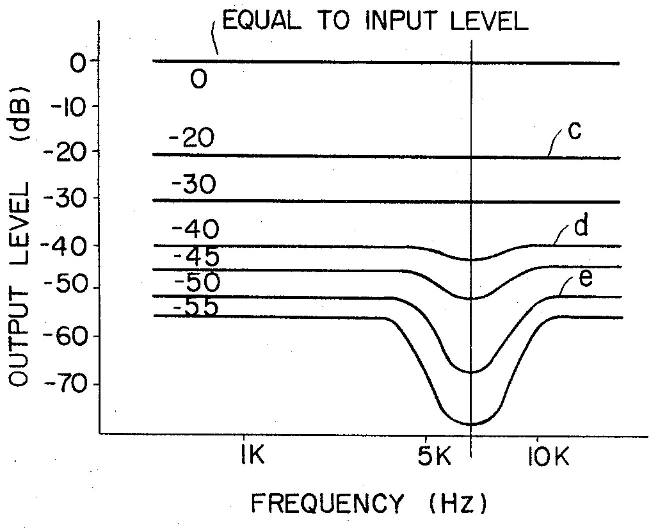
FIG. 11 is a graph showing a noise eliminating characteristic of a device according to the invention.

Because of the operational region in the characteristic curve shown in FIG. 10(A) at the time the input signal level is −20 dB is along a portion *a* of the characteristic curve, the variable impedance circuit 5 exhibits a very low impedance. Although the band-elimination filter 4 is also provided as described in the transmission circuit 1 of the audio signals, most of the audio signals pass through the variable impedance circuit 5 now in the low-impedance condition, and at the output terminal 6, a flat transmission characteristic as presented by C in FIG. 11 can be obtained.

When the input signal level after the buffer amplifier 3 descends to a value of from −40 dB to −50 dB, at which level the noises cannot be masked by the audio signals, the output from the band-pass filter 7 is also decreased, and the control biasing signals obtained from the control signal producing circuit 8 are also minimized. As a result, the variable impedance circuit is operated in the region *b* along the characteristic curve shown in FIG. 10(A), and the impedance of the circuit 5 is elevated. Thus, most of the audio signals are sent through the band-elimination filter 4, while the rest of the audio signals is passed through the variable impedance circuit 5. As a result, the sum of an output of the band-elimination filter 4 and that of the variable impedance circuit 5 appears as an output at the output terminal 6. The characteristics of this output has a band elimination characteristic as represented by *d* or *e* in FIG. 11 according to the input levels of the audio signals, being different in attenuation quantity. Thus, of the noises contained in the audio signals, the noises highly sensible to an auditor can be reduced or eliminated.

Figure 13:
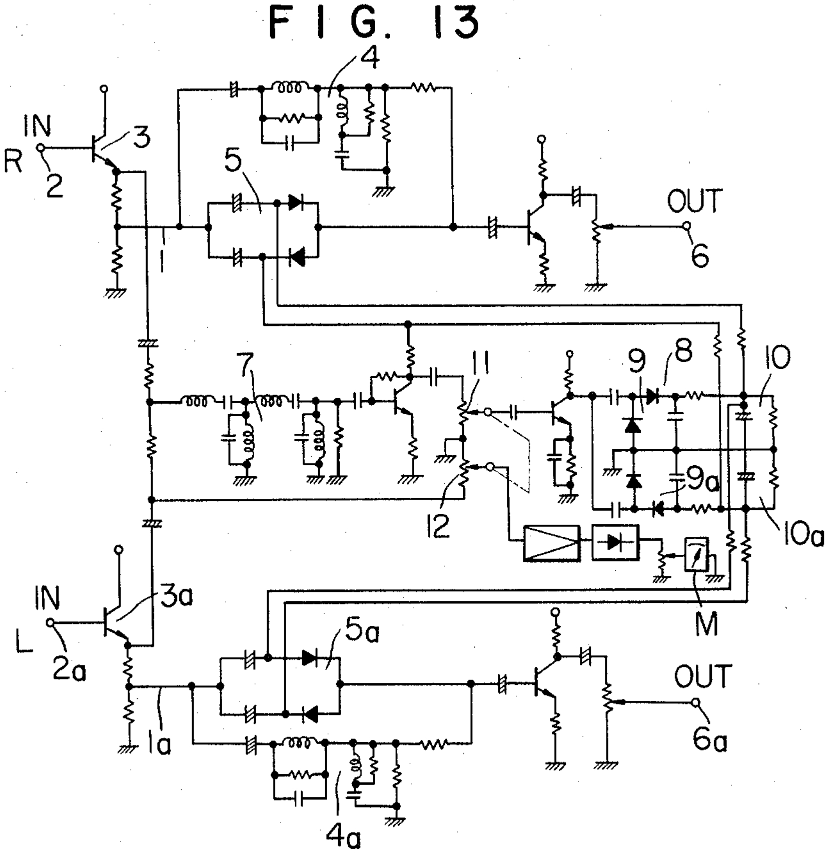
FIG. 13 is a circuit diagram showing a second embodiment of the present invention.

Referring to FIG. 13, there is indicated another embodiment of the present invention, wherein two transmission lines 1 and 1*a* such as those in a stereophonic audio device are provided, and the noise eliminating circuits as described above are provided for these transmission lines 1 and 1*a*, respectively. In this circuit, a part of the output from each of the buffer amplifiers 3 and 3*a* is branched off and synthesized, and then passed through a band-pass filter 7 and a control signal producing circuit 8. The control biasing signals thus produced in the circuit 8 are thereafter applied to the variable impedance circuits 5 and 5*a* provided respectively in the transmission paths 1 and 1*a*, whereby the circuit components required for the production of the control signals can be substantially and economically reduced.

Figure 14:
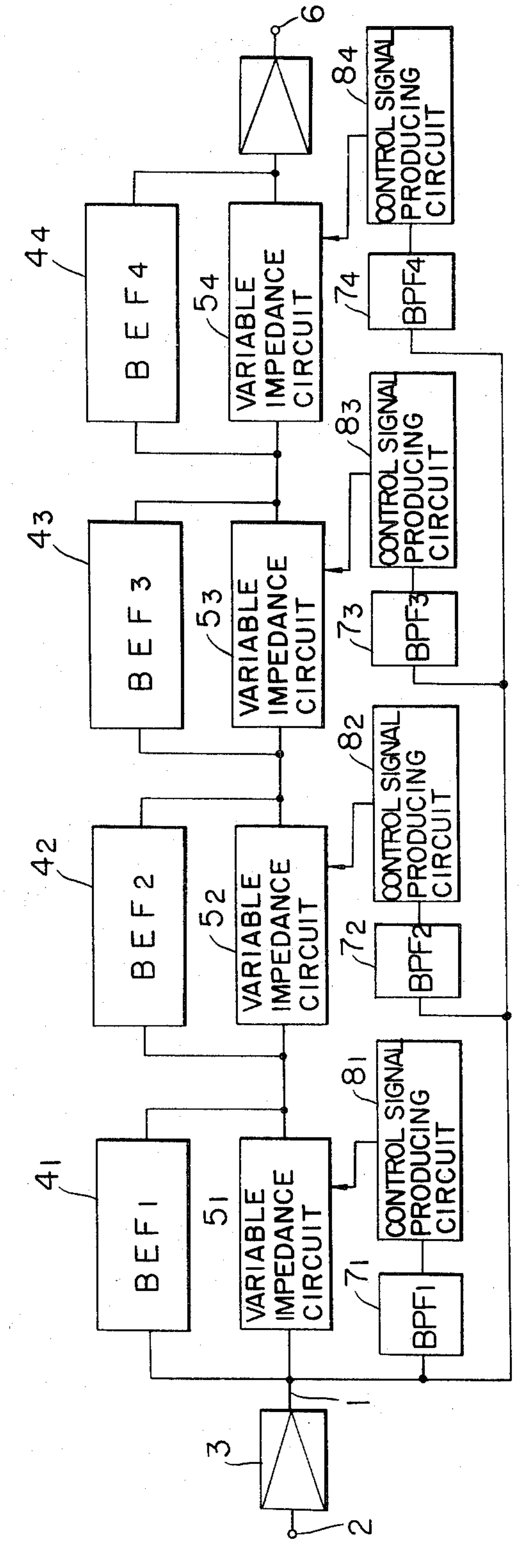
FIG. 14 is a block diagram showing a third embodiment of the invention.
Figure 15:
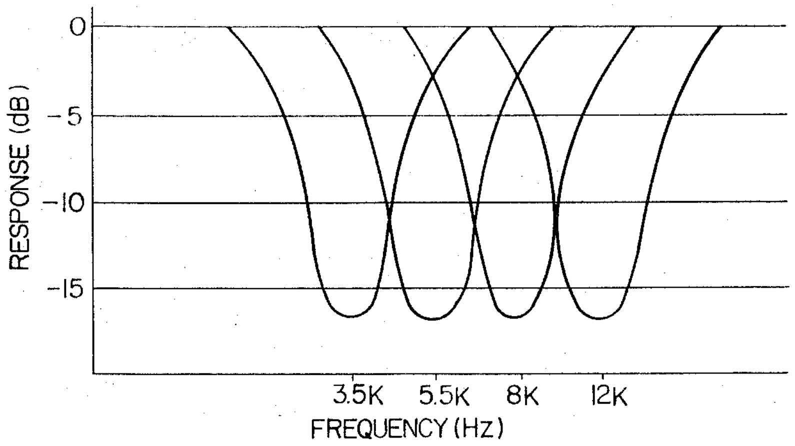
FIGS. 15 and 16 are graphs showing characteristics of a band-elimination filter and a band-pass filter employed in the third embodiment of the invention.
Figure 16:
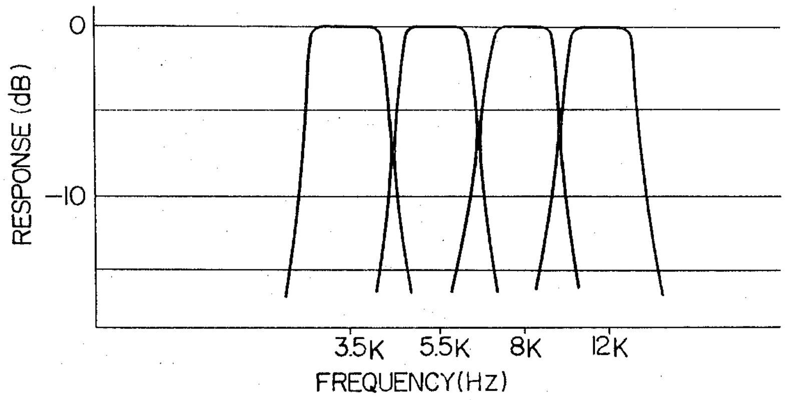

In FIG. 14, there is indicated still another embodiment of the present invention, wherein the frequency band in which the noises contained in audio signals are highly sensible to the auditor but the instances of appearance therein of the audio signals are substantially few is divided into four parts, and there are provided four band-elimination filters $4_1$ through $4_4$, each of which is provided with a characteristic as shown in FIG. 15 for blocking a corresponding one of the above mentioned four portions of the frequency band; four variable impedance circuits $5_1$ through $5_4$ each connected in parallel with one of the four band-elimination filters; four band-pass filters $7_1$ through $7_4$ each passing the same frequency portion as that blocked by each of the band-elimination filters $4_1$ through $4_4$ and each having a band-pass characteristic as shown in FIG. 16; and four control signals producing circuits $8_1$ through $8_4$, each of which rectifies the output of a corresponding one of the band-pass filters $7_1$ through $7_4$ and supplies the thus rectified d.c. biasing signal to the corresponding one of the variable impedance circuits $5_1$ through $5_4$.

Figure 17:
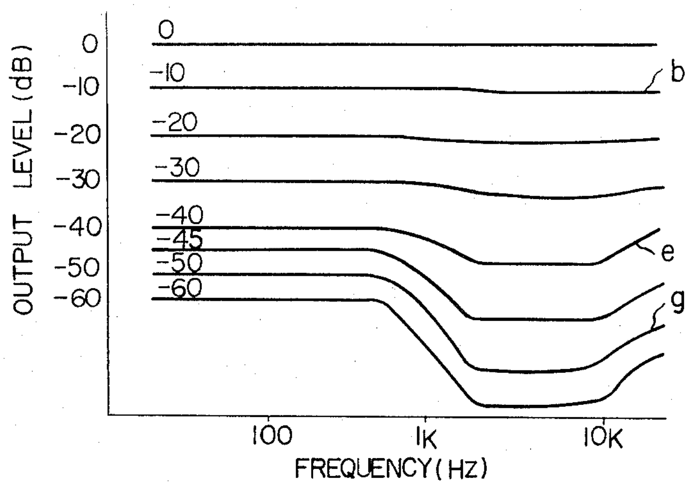
FIG. 17 is a graph showing a noise eliminating characteristic of the third embodiment of the invention.

This circuit has output characteristics as indicated in FIG. 17, whereby the noises contained in the audio signals can be eliminated more effectively.

Figure 18:
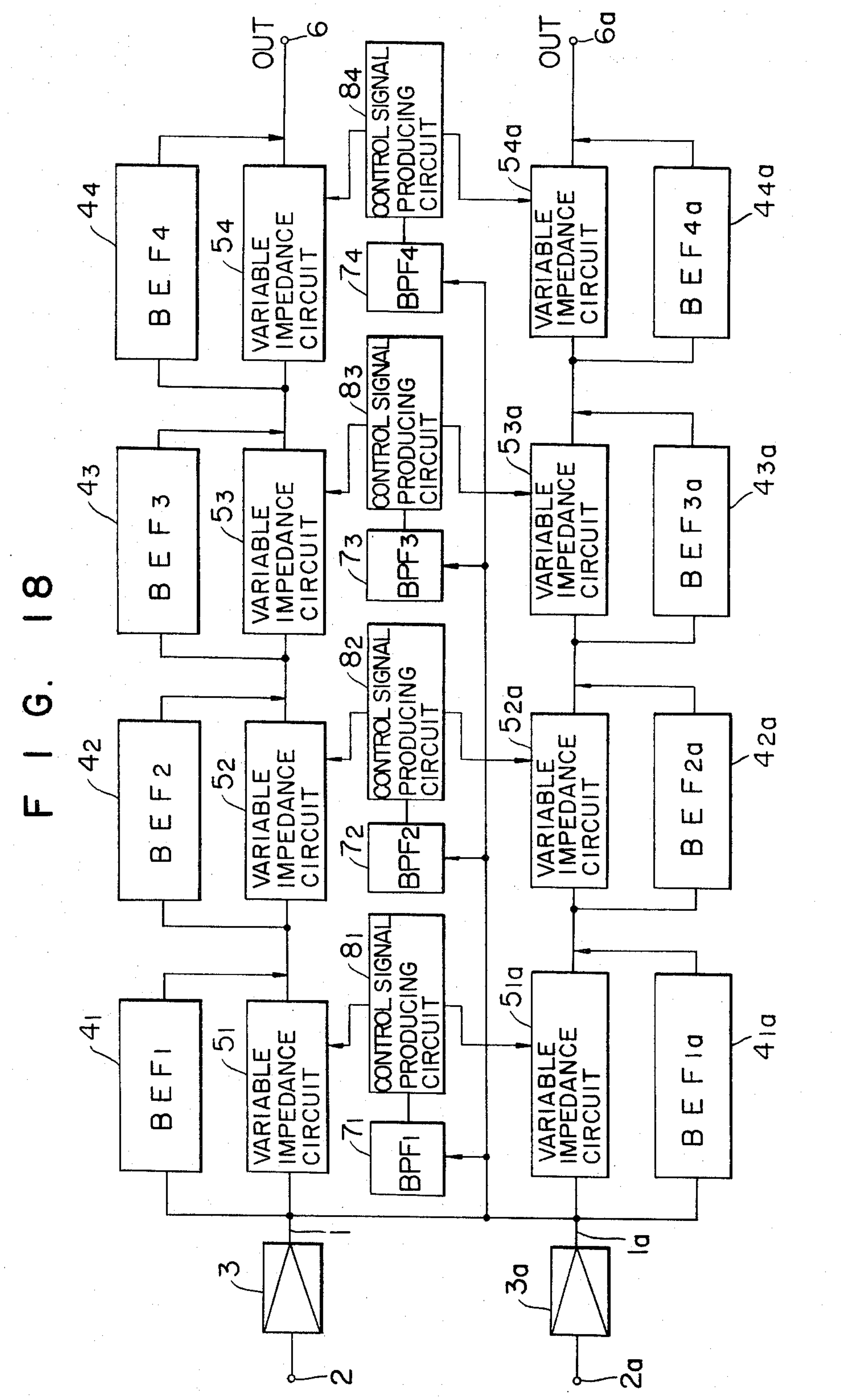
FIG. 18 is a block diagram showing a fourth embodiment of the present invention.

FIG. 18 illustrates still another embodiment of the present invention wherein the above described concept of dividing the frequency band into four portions is applied to the case including two transmission lines 1, 1*a* which separately pass different audio signals, as in the case of the stereophonic apparatus, which has been described with respect to FIG. 13. A characteristic feature of this circuit is that the band-pass filters $\mathbf{7}_1$ through $\mathbf{7}_4$ and the control signal producing circuits $\mathbf{8}_1$ through $\mathbf{8}_4$, both employed for controlling the variable impedance circuits $\mathbf{5}_1$ through $\mathbf{5}_4$ and $\mathbf{5}_{1a}$ through $\mathbf{5}_{4a}$, can be commonly utilized for both of the transmission lines 1 and 1*a*, whereby the required number of circuit components can be substantially reduced.

From the foregoing description with respect to various embodiments of the present invention, it will be apparent that according to the present invention a frequency band wherein noises contained in audio signals are highly sensible to an auditor, but the instances of appearance therein of audio signals are rather few is selected, and a band-elimination filter is operated in this frequency band when an input signal level in this band is lower than a predetermined value. Accordingly, the noises included in this band can be substantially eliminated, and when the input signal level in this band is higher than the predetermined value, the band-elimination filter is placed in an inoperative condition because of the low impedance of a variable impedance circuit by-passing the band-elimination filter, whereby noises contained in the most sensible frequency band thereof can be masked by the audio signals which are higher than said predetermined value.

Although the present invention has been described with respect to preferred embodiments thereof, it will be apparent that various modifications or alterations can be made in specific circuit portions described hereinabove without departing from the spirit and scope of the present invention. For instance, the band-elimination filter and the band-pass filter may be of any other types of well known filters, and the control signal producing circuit may utilize rectifying circuit components other than those in the above described diodes.

I claim:

1. A noise reducing device comprising:

a. a transmission line for transmitting audio signals;
b. a band-elimination filter provided in said transmission line for blocking a predetermined frequency band wherein noises are contained in the audio signals;
c. a variable impedance shunting circuit connected in parallel with said band-elimination filter for conducting the audio signals therethrough the output of said band-elimination filter and said variable impedance circuit being combined;
d. a band-pass filter provided in said transmission line for receiving part of the audio signals and passing the same frequency band thus blocked by said band-elimination filter; and
e. a control signal producing circuit for producing a control signal out of the output of said band-pass filter for controlling the impedance of said variable impedance circuit.

2. A device as defined in claim 1, wherein said control signal is produced when the level of signals from the band-pass filter is below a predetermined value, said control signal increasing the impedance of said variable impedance shunting circuit whereby a larger portion of said audio signals are passed through said band-elimination filter increasing the effectiveness thereof.

3. A noise reducing device for reducing noises contained in audio signals, which comprises:

a. a transmission line for transmitting audio signals;
b. a buffer amplifier provided at the input side of said transmission line;
c. a band-elimination filter provided at the output side of said buffer amplifier for blocking a predetermined frequency band wherein noises are contained in the audio signals;
d. a variable impedance shunting circuit connected in parallel with said band-elimination filter for conducting the audio signal therethrough, the output of said band-elimination filter and said variable impedance circuit being combined;
e. a band-pass filter provided at the output side of said buffer amplifier for receiving a part of the output thereof and passing the frequency band equal to that blocked by the band-elimination filter; and
f. a control signal producing circuit for rectifying the output of said band-pass filter and producing a control signal for controlling the impedance of said variable impedance circuit.

4. A device as defined in claim 3, wherein said control signal is produced when the level of signals from the band-pass filter is below a predetermined value, said control signal increasing the impedance of said variable impedance shunting circuit whereby a larger portion of said audio signals are passed through said band-elimination filter increasing the effectiveness thereof.

5. A noise reducing device for reducing noises contained in audio signals comprising:

a. a transmission line for transmitting the audio signals;
b. a band-elimination filter provided in said transmission line for blocking a frequency band wherein noises are highly sensible to an auditor;
c. a variable impedance shunting circuit connected in parallel with said band-elimination filter for conducting the audio signals therethrough, the output of said band-elimination filter and said variable impedance circuit being combined;
d. a band-pass filter receiving a part of the audio signals and passing the same frequency band thus blocked by said band-elimination filter;
e. a variable resistor for varying the output of said band-pass filter and adjusting the noise-reducing level of this device;
f. a control signal producing circuit for rectifying the output of said variable resistor connected to said band-pass filter to obtain control signals for controlling the impedance of said variable impedance circuit; and
g. another variable resistor interlinked with said first variable resistor for adjusting the input level of an indicating circuit and connected to receive the audio signals from the transmission line for amplifying and indicating the input level of the amplified audio signals.

6. A device as defined in claim 5, wherein said control signals are produced when the level of signals from the band-pass filter is below a predetermined value, said control signals increasing the impedance of said variable impedance shunting circuit whereby a larger portion of said audio signals are passed through said band-elimination filter increasing the effectiveness thereof.

7. A noise reducing device for reducing noise contained in audio signals comprising:

a. a transmission line for transmitting to the audio signals;

b. a buffer amplifier provided at the input side of said transmission line;

c. at least two band-elimination filters provided in series at the output side of said buffer amplifier for blocking respectively two divided portions of a predetermined frequency band wherein noises are contained in the audio signals;

d. a variable impedance shunting circuit connected in parallel with each of said band-elimination filters for conducting the audio signals therethrough, the output of said band-elimination filters and said variable impedance circuits being combined;

e. at least two-band-pass filters for receiving a part of the output of said buffer amplifier and passing the frequency band blocked by said band-elimination filter; and f. a control signal producing circuit for rectifying the outputs of said band-pass filters separately for obtaining control signals which control the impedance of said variable impedance circuits connected in parallel with said band-elimination filters corresponding to those band-pass filters from which the outputs are obtained for the rectification.

8. A device as defined in claim 7, wherein said control signals are produced when the level of signals from the band-pass filters is below a predetermined value, said control signals increasing the impedance of said variable impedance shunting circuit whereby a larger portion of said audio signals are passed through said band-elimination filters increasing the effectiveness thereof.

* * * * *